United States Patent
Pleshachkov et al.

(10) Patent No.: US 10,678,856 B1
(45) Date of Patent: Jun. 9, 2020

(54) SYSTEM AND METHOD TO REPRESENT PHYSICAL DATA POINTERS OF MOVABLE DATA LIBRARY

(71) Applicant: EMC IP Holding Company LLC, Hopkinton, MA (US)

(72) Inventors: Petr Olegovich Pleshachkov, Nootdorp (NL); Sikan Chen, Shanghai (CN); Valery Maltsev, Delft (NL)

(73) Assignee: EMC IP Holding Company LLC, Hopkinton, MA (US)

( * ) Notice: Subject to any disclaimer, the term of this patent is extended or adjusted under 35 U.S.C. 154(b) by 603 days.

(21) Appl. No.: 15/281,330

(22) Filed: Sep. 30, 2016

(51) Int. Cl.
   - G06F 16/81 (2019.01)
   - G06F 16/84 (2019.01)
   - G06F 16/21 (2019.01)
   - G06F 16/2455 (2019.01)

(52) U.S. Cl.
   CPC ............ *G06F 16/81* (2019.01); *G06F 16/211* (2019.01); *G06F 16/24562* (2019.01); *G06F 16/86* (2019.01)

(58) Field of Classification Search
   CPC ......... G06F 17/30911; G06F 16/24562; G06F 16/86; G06F 16/211; G06F 16/81
   See application file for complete search history.

(56) References Cited

U.S. PATENT DOCUMENTS

| | | | | |
|---|---|---|---|---|
| 6,763,496 B1* | 7/2004 | Hennings | .......... | G06F 17/30899 707/E17.119 |
| 2004/0205638 A1* | 10/2004 | Thomas | ................ | G06F 3/0482 715/273 |
| 2006/0112018 A1* | 5/2006 | Lee | ...................... | H04L 12/2803 705/59 |
| 2008/0046476 A1* | 2/2008 | Anderson | ......... | G06F 17/30088 |
| 2010/0174731 A1* | 7/2010 | Vermeulen | ........ | G06F 17/30212 707/758 |
| 2015/0161119 A1* | 6/2015 | Fisher | ............... | G06F 17/30749 707/770 |
| 2016/0170823 A1* | 6/2016 | Miller | ................. | G06F 11/0772 714/56 |

OTHER PUBLICATIONS

Louie, David "xDB 10.0: Introduction to Multi-node", http://www.community.emc.com/docs/DOC-7462, Jun. 22, 2010 (4 pages).

* cited by examiner

*Primary Examiner* — Cam Y T Truong
(74) *Attorney, Agent, or Firm* — Chamberlain, Hrdlick, White, Williams & Aughtry

(57) ABSTRACT

In general, embodiments of the technology relates to a method for attaching a detachable library. The method includes obtaining a detachable library, wherein the detachable library comprises a plurality of data files and each of the data files comprises a library scope identifier (ID), and where the library scope IDs are unique within the detachable library and reattaching the detachable library to a database. The method further includes assigning a node scope ID to each of the data files in the detachable library, where the node scope IDs are unique within the database, creating a mapping index using the node scope IDs and the library scope IDs, and processing a request from a client using the mapping index, where the request includes a library scope ID.

20 Claims, 7 Drawing Sheets

SYSTEM AND METHOD TO REPRESENT PHYSICAL DATA POINTERS OF MOVABLE DATA LIBRARY

BACKGROUND

Content may be stored in persistent storage and accessed by a content management system. In certain implementations, the persistent storage may be detached from the content management system and archived for long term storage. At some later point in time, the archived content may be required. In such scenarios, the archived content may be retrieved and associated with a new content management system. Because the archived content was originally created and/or stored using a different content management system, it may be difficult to obtain the archived content using the new content management system.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-7, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for creating a detachable library that may be readily attached to a new database, where the new database may easily access content in the detachable library. More specifically, a layer of indirect addressing, a library scope identifier (ID), is introduced. By assigning each data file in the detachable library both a library scope ID and node scope ID (i.e., an identifier assigned by the particular instance of a database), the data files (and pointers therein) are decoupled from the database instance that created the detachable library. By using the two aforementioned IDs, the file identifier collision is avoided when attaching the detachable library to the new database. Further, the using of the two aforementioned IDs permits efficient attachment of the detachable library to a new database as it does not require any modification of the file pointer that are included with the detachable library.

Figure 1:
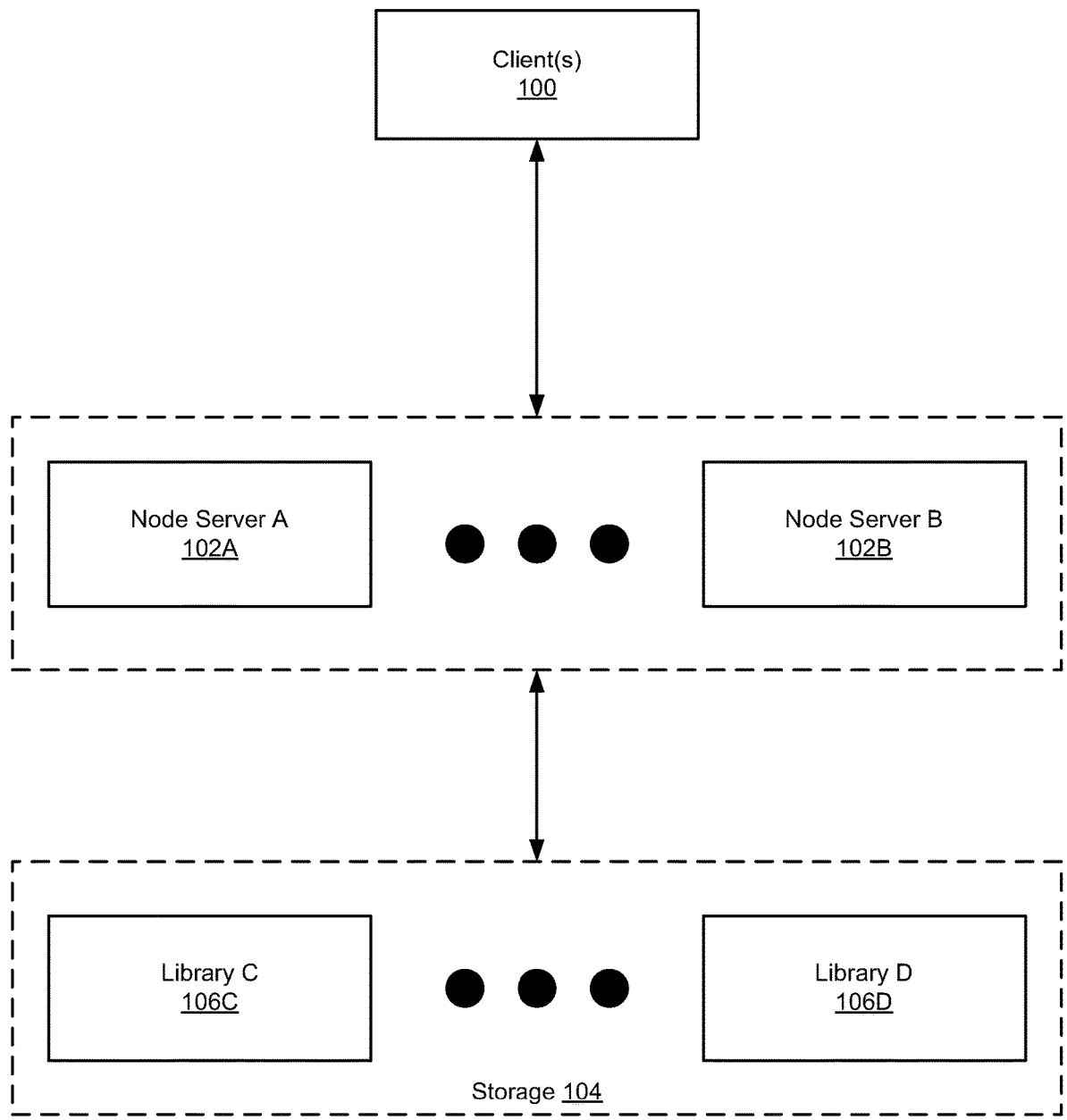
FIG. 1 shows an exemplary system in accordance with one or more embodiments of the technology.

FIG. 1 shows an exemplary system in accordance with one or more embodiments of the technology. The system includes one or more client systems (100), one or more node servers (102A, 102B), and a storage (104) with one or more libraries (106C, 106D). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system corresponds to any computing system (see e.g., FIG. 7) that includes functionality to issue requests (also referred to as queries) to the node servers (102A, 102B) and to receive a corresponding response(s) from the node servers after the request has been serviced.

Continuing with the discussion of FIG. 1, the node servers include functionality to perform all or a portion of the methods shown in FIGS. 3-6. The node servers may also include functionality to perform various actions (e.g., read, write, delete, modify, send, etc.) on the files stored in the libraries when servicing requests from the client systems (see e.g., FIGS. 3-6). The node servers may provide database management service, such as detaching a library from a database and reattaching the library to another database.

Figure 6A:
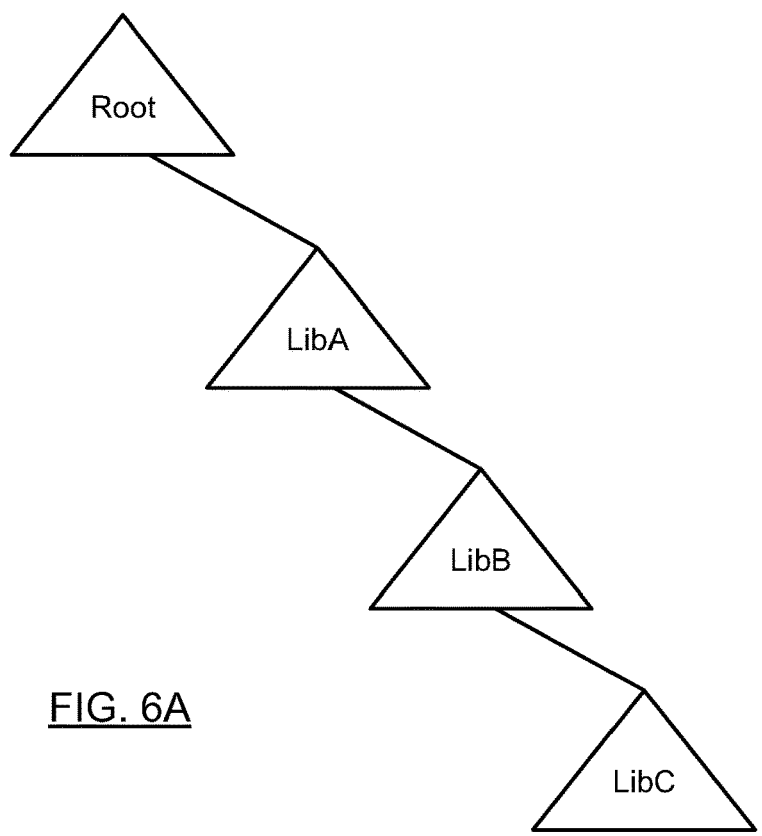
FIG. 6 shows an example in accordance with one or more embodiments of the technology.
Figure 6B:
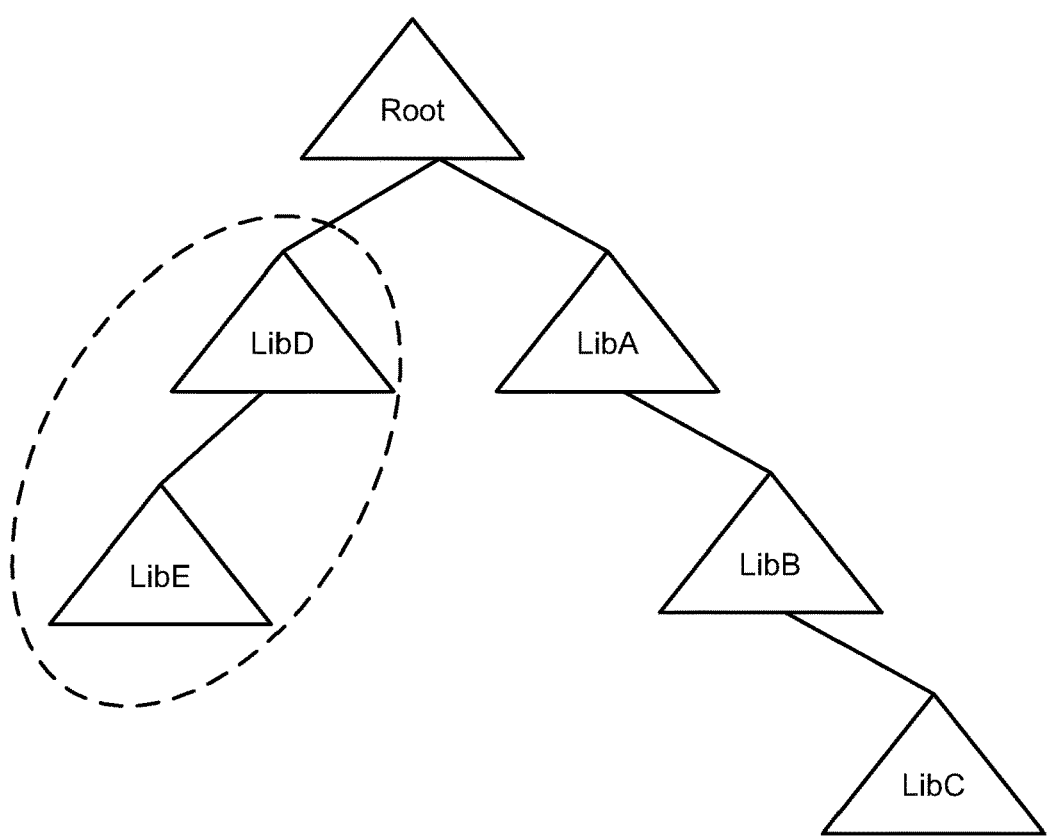
Figure 7:
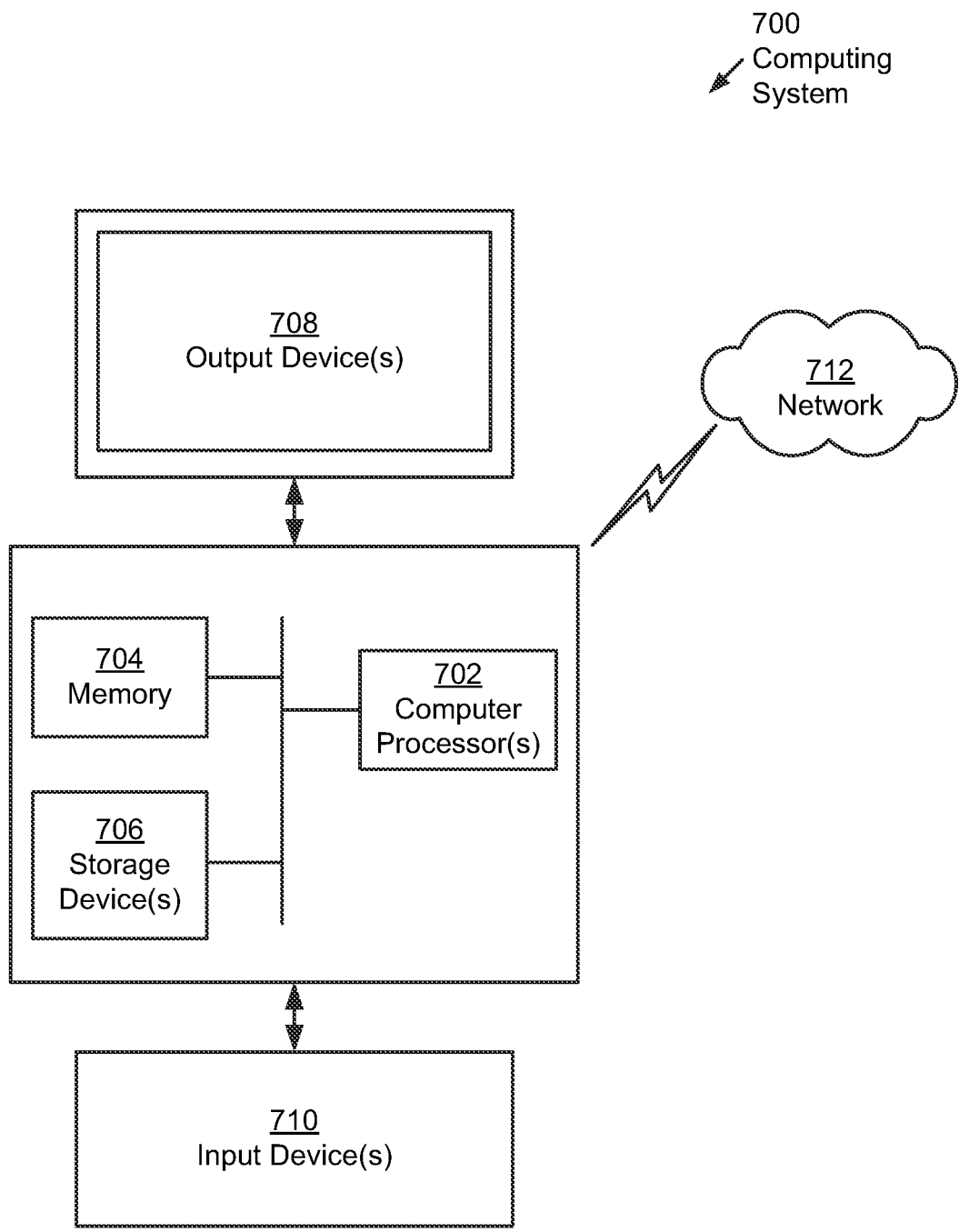
FIG. 7 shows a computing system in accordance with one or more embodiments of the technology.

Each node (102A, 102B) may be implemented using one or more computing systems (see e.g., FIG. 7). Additional detail about the operation of the nodes is provided in FIGS. 2A and 3-6.

In one embodiment of the technology, the storage (104) includes persistent storage (e.g., solid state storage, magnetic storage, optical storage, any other type of persistent storage or any combination thereof) in which libraries are stored.

Continuing with the discussion of the storage, the storage may store libraries (106C, 106D) using any known or subsequently discovered mechanism. The following describes various examples of the mechanisms that may be used to store libraries. The examples are not intended to limit the technology. In a first example, the storage (104) may be a set of magnetic hard disks. In a second example, the storage (104) may be implemented using a computer cluster that is executing a distributed file system. In a third example, the storage (104) may be implemented using a network file server and one or more block-storage devices (i.e., as a Storage Area Network).

Each library (106C, 106D) may include one or more data files (see e.g., FIG. 2B, FIG. 2C) and is accessible via one or more nodes. The data files may be eXtensible Markup Language (XML) files. Data files in other file formats may be used without departing from the technology. Each data file may include references (also referred to as library scope pointers) to other data files in the library and/or references to other data files in other libraries. Additional detail about the data files is described below in FIG. 2C. Those skilled in the art will appreciate that the data files may be stored in the storage in a binary format or any other format supported by the storage media.

In one embodiment of the technology, the system shown in FIG. 1A is a shared-nothing distributed system. In such embodiments, each node server may only access its own storage. For example, consider a scenario in which the system includes two node servers (e.g., node server 1, node server 2) and four separate storage devices (e.g., storage device 1, storage device 2, storage device 3, and storage device 4). Further, assume that storage devices 1 and 2 are attached to node server 1 and storage devices 3 and 4 are only attached to node server 2. In this scenario, node server 1 may only access the data stored on storage devices 1 and 2 and node server 2 may only access the data on storage devices 3 and 4.

The technology is not limited to the architecture of the system shown in FIG. 1.

Figure 2A:
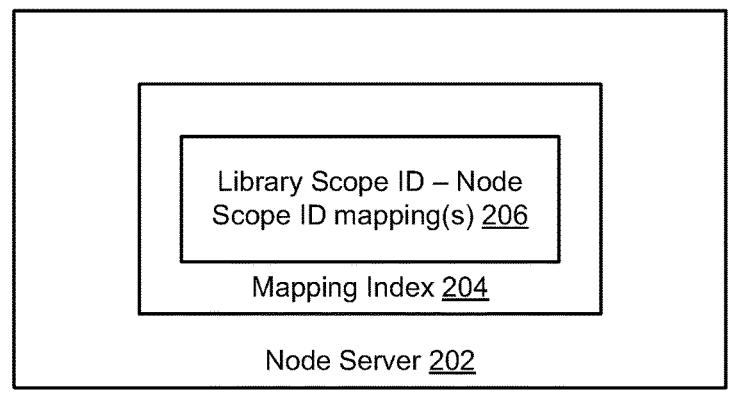
FIGS. 2A-2C show various relationships between components in accordance with one or more embodiments of the technology.
Figure 2B:
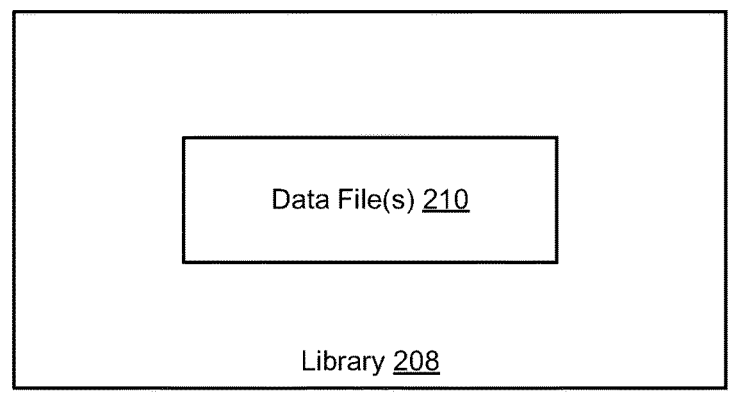
Figure 2C:
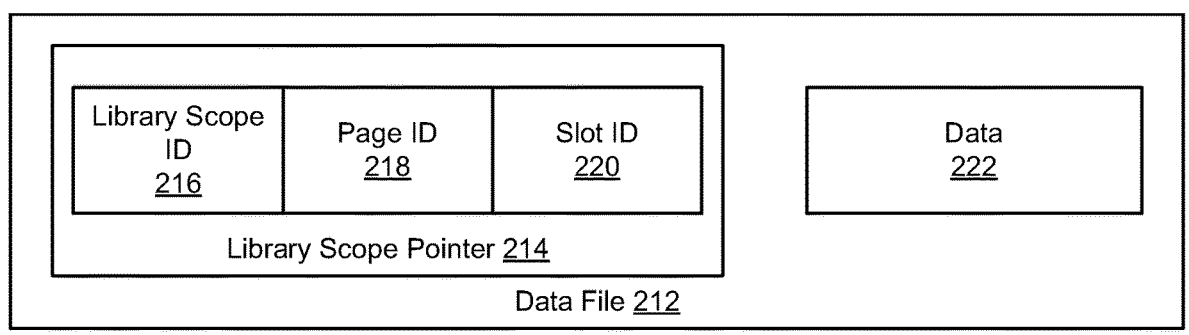

FIGS. 2A-2C show various relationships between components in accordance with one or more embodiments of the technology. Turning to FIG. 2A, in one embodiment of the technology, each node server (200) includes a mapping index (204) which keeps track of the mappings between a library scope ID and a node scope ID (206). The node server may only maintain a mapping index for the libraries to which it is attached. Said another way, the node server may not include a mapping index that covers all data file in all libraries that are attached to any node server in the system; rather, a given node server may only include a mapping index with entries for data file in libraries that it accesses (or is able to access).

In one embodiment of the technology, the library scope ID is assigned to each data file in a library. The library scope ID for a given data file does not change over time (regardless to which database it is attached). Further, the library scope ID uniquely identifies the data file within the library; however, the library scope ID may not be a globally unique ID. Said another way, other data files in other libraries may have the same library scope ID. In one embodiment of the technology, a node scope ID is assigned to a data file by a particular database (database) instance (see e.g., FIGS. 3-4). The node scope ID for a given data file in a library may change each time it is attached to a different database.

Referring to FIG. 2B, in one embodiment of the technology, each library (208) includes one or more data files (210) and each data file is assigned both a library scope ID and the node scope ID. As discussed above, a data file may reference one or more other data files. The data file uses a library scope pointer to reference other data files. Additional detail about the contents of a data file is shown in FIG. 2C.

Referring to FIG. 2C, in one embodiment of the technology, a data file may include one or more library scope pointers (214) and data (222). Each library scope pointer (214) includes three fields: a library scope ID (216) (described above), a page ID (218) and a slot ID (220). The page ID (when multiplied by page size) denotes an offset within a data file and the slot ID denotes a sequence of bytes within that page starting at the offset. In other words, any required data from the data file can be located by the pointer in the form of <library scope ID+page ID+slot ID>.

By using library scope pointers in the library, all references within the library are self-contained and, as such, the library may be readily detached and reattached to a new database while preserving the references within the library. Said another way, because the references in the library are self-contained, the references do not need to be updated when the library is subsequently reattached to another database.

Figure 3:
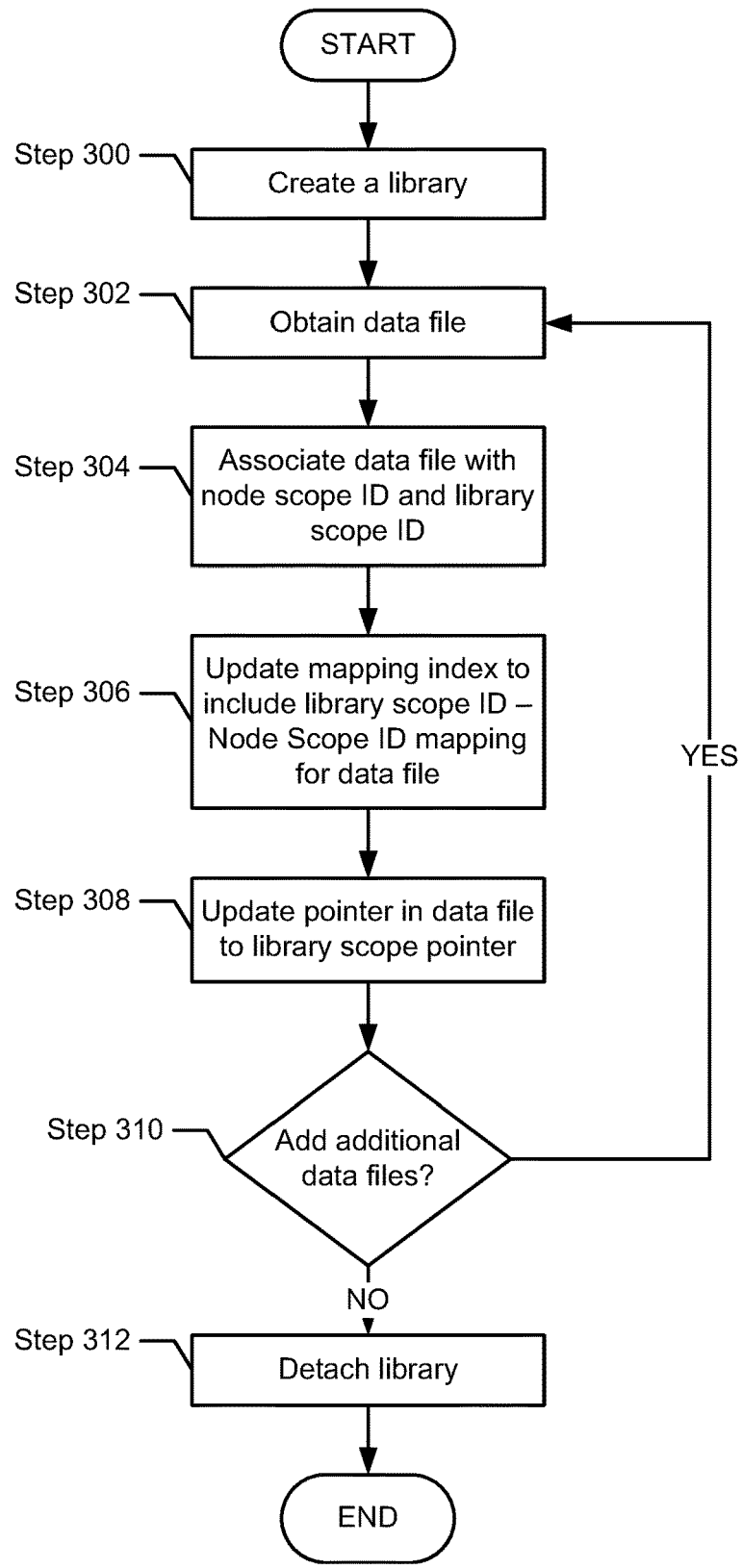
FIG. 3 shows a flowchart for creating a library in accordance with one or more embodiments of the technology.
Figure 4:
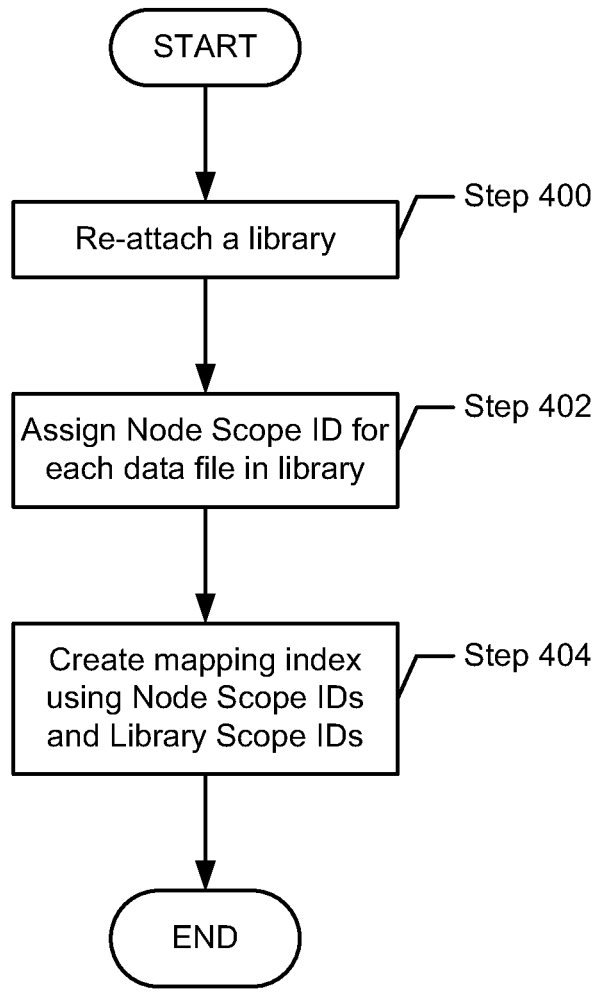
FIG. 4 shows a flowchart for reattaching a detached library in accordance with one or more embodiments of the technology.
Figure 5:
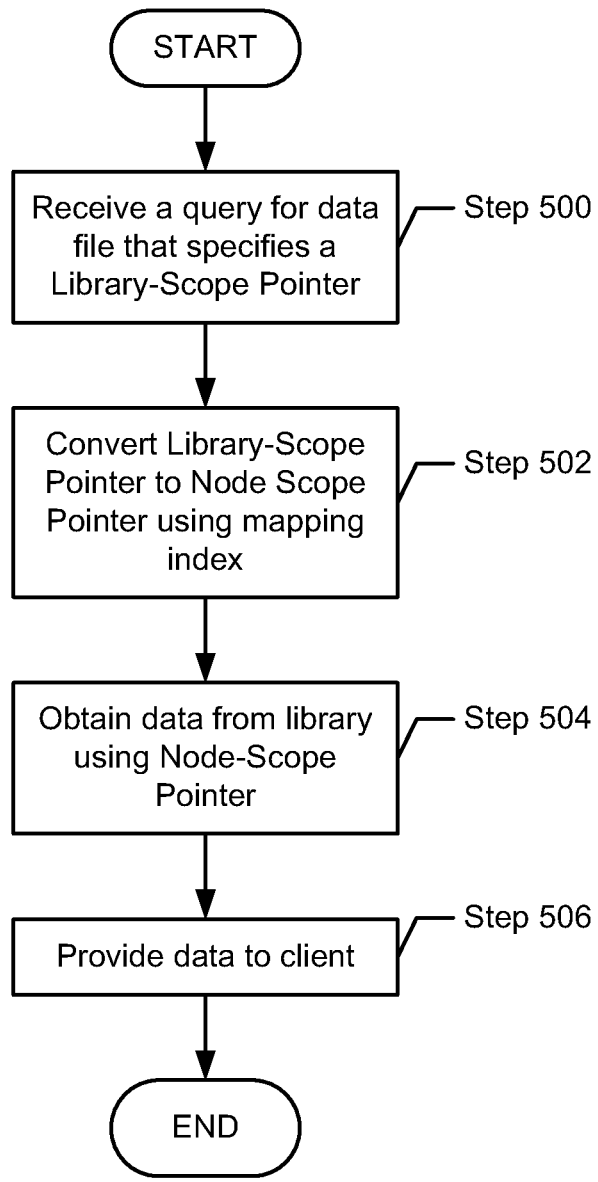
FIG. 5 shows a flowchart for processing a request in accordance with one or more embodiments of the technology.

FIGS. 3-5 show flowcharts in accordance with one or more embodiments of the technology. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

FIG. 3 shows a flowchart for creating a library in accordance with one or more embodiments of the technology.

In step 300, a library is created. The creation of library may include specifying a library name and/or path. At the time the library is initially created, the library may not have any data files.

In step 302, at some point after the creation of the library, a data file is obtained.

In step 304, the data file is associated with a node scope ID and a library scope ID. The node scope ID is assigned based on the database instance of which this library is a part and the library scope ID is assigned by the node server (or another process). The node scope ID and the library scope ID may be assigned using any known or later developed mechanism that ensures no ID collisions. Further, the node scope ID and the library scope ID may include letters, numbers, symbols, or any combination thereof.

In step 306, the mapping index is updated to include the mapping between the library scope ID and the node scope ID for this data file.

In one embodiment of the technology, step 308 may be performed. Specifically, if the data file that is being added to the library includes a reference(s) that is not a library scope pointer(s), then in step 308, the reference(s) is replaced with a library scope pointer(s). However, if all references in the data file are library scope pointers or the data file does not include any references, then step 308 is not performed. In one embodiment of the technology, if step 308 is performed, it is performed by the node server prior to the data file being stored on the persistent storage.

In step 310, a determination is made about whether there are any additional data files to be added to the library. If there are additional libraries to be added, the process proceeds to step 302; otherwise the process ends. Those skilled in the art will appreciate that steps 302-310 may be repeated for other data files at other points time.

At some later point in time, in step 312, the library is detached. Detaching a library may include physically moving the library to new/different persistent storage. Once a library is detached, it is no longer accessible to any node server until it is subsequently re-attached. The detachable library may be part of a hierarchy of libraries (see e.g., FIG. 6). In such cases, detaching the library may include detaching the library and the corresponding child libraries. For example, with reference to FIG. 6, detaching library B (Lib B) may also include detaching Library C (Lib C).

FIG. 4 shows a flowchart for reattaching a detached library in accordance with one or more embodiments of the technology.

In step 400, a library is reattached to a database. It may be reattached to the same database from which it was detached or to a different database. In one embodiment of the technology, the database may be implemented using one or more node servers.

In step 402, a new node scope ID is assigned to each data file in the library. In one embodiment of the technology, the new node scope ID is assigned by the database instance (or by the specific node server) to which the library is attached. However, as discussed above, the library scope IDs associated with the data files in the library remain the same.

In step 404, a mapping index is created (or updated) using the node scope IDs and the library scope IDs for the newly attached library. More specifically, the node server(s) may read the data files in order to obtain library scope IDs included within the library scope pointers in the data files. The node server may subsequently map the obtained library scope IDs to the corresponding node scope IDs specified by the database (i.e., the database executing on the node server(s)).

In one embodiment of the technology, the library may include a reference to a data file in a parent library. For example, referring to FIG. 6, a data file in Lib B may include a reference to a data file in Lib A. This pointer may include a library scope ID for data file in the parent library. Accordingly, the mapping index created (or updated) in step 404 may also include a mapping index entry for the data file in the parent library.

Further, the library may include a reference to a data file in one or more child libraries. For example, referring to FIG. 6, a data file in Lib B may include a reference to a data file in Lib C. This pointer may include a library scope ID for data file in the child library. Accordingly, the mapping index created (or updated) in step 404 may also include a mapping index entry for the data file in the child library.

FIG. 5 shows a flowchart for processing a request in accordance with one or more embodiments of the technology.

In step 500, a request for data (while may be the entire data file or part of data file) that specifies a library scope pointer is received. In one embodiment of the technology, the client includes an application and a client driver. In this scenario, the application may issue queries to the node server, where the query is specified using any known or later discovered query language. The query is subsequently received by the client driver. The client driver may then convert the query into one or more requests, where the request includes library scope pointer(s). The client driver may then issue the request to the node server. In this scenario, the application is not aware of any of the IDs that are used by the node server or any of the attached libraries.

In step 502, the library scope pointer is converted to node scope pointer using the mapping index. As discussed in FIG. 2C, the library scope pointer is in the form of <library scope ID+page ID+slot ID>. By using the mapping index, the library scope ID is converted to node scope ID. Then the node scope pointer is obtained in the form of <node scope ID+page ID+slot ID>.

In step 504, the queried data is obtained from the library using the node scope pointer. The node scope pointer is the physical data pointer in the database instance. Every single item of data in the library can be located by the physical data pointer.

In step 506, the obtained data is provided to the client system that issued the request.

FIGS. 6A and 6B show an example in accordance with one or more embodiments of the technology. The example is not intended to limit the scope of the technology.

FIG. 6A shows the tree hierarchy before a detachable piece is attached. In this example, the root library (denoted as root) has one data file (not shown) with library scope ID of 0, and node scope ID of 121. Therefore, the mapping index of the root library is:

0↔121

FIG. 6B shows two detachable libraries being added to the hierarchical tree. In this example, LibD includes two data files (not shown) with library scope IDs of 0 and 1, respectively. Further, LibD includes a reference to the data file in the root library with a library scope ID of 2 and a node scope ID of 121. Finally, LibD includes a reference to a data file in LibE with a library scope ID of 3 and a node scope ID of 127.

The resulting mapping index for LibD is as follows:
0↔123
1↔124
2↔121
3↔127

Finally, LibE includes one data file with a library scope ID of 0 and a node scope ID of 127. In addition, LibE includes a reference to a data file in its parent (i.e., in LibD). The parent data file includes a library scope ID of 1 and a node scope ID of 123.

The resulting mapping index for LibE is as follows:
0↔127
1↔123

As shown in this example, each library (i.e., the root library, LibD, and Lib E) includes library scope IDs that are only unique within the context of their own library but not within the database as a whole. However, library scope IDs is mapped to a node scope ID, which is unique within the context of the entire database. Moreover, as shown in the example, while each data file has a unique node scope ID, it may have multiple associated library scope IDs. For example, the data file in LibD with a node scope ID of 123 is associated with a library scope ID of 0 in LibD and a library scope ID of 1 in LibE.

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (700) may be located at a remote location and connected to the other elements over a network (714). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for attaching a detachable library, comprising:
   obtaining the detachable library, wherein the detachable library comprises a plurality of data files and each data file of the data files comprises a library scope identifier (ID), and wherein the library scope IDs are unique within the detachable library;
   reattaching the detachable library to a database;
   assigning a node scope ID to each data file of the data files in the detachable library, wherein the node scope IDs are unique within the database;
   creating a mapping index using the node scope IDs and the library scope IDs, wherein the mapping index comprises a mapping index entry specifying a library scope ID for a data file in a parent library and a node scope ID;
   processing a request from a client using the mapping index, wherein the request comprises a library scope ID.

2. The method of claim 1, further comprising:
   prior to obtaining a detachable library:
      creating a library;
      obtaining the plurality of data files; and
      detaching the library to obtain a detachable library.

3. The method of claim 1, wherein processing the request comprises:
   receiving the request for data from the client, wherein the request specifies a library scope pointer comprising the library scope ID;
   converting the library scope pointer to a node scope pointer using the mapping index, wherein the node scope pointer include a node scope ID corresponding the library scope ID;
   obtaining data from the detachable library using the node scope pointer; and
   providing the data to the client.

4. The method of claim 1, wherein at least one data file of the plurality of data files comprises data and a library scope pointer, wherein the library scope pointer comprises a library scope ID, a page ID, and a slot ID.

5. The method of claim 1, wherein the mapping index is stored in a node server, wherein the database is executing on the node server.

6. The method of claim 1, wherein the library comprises eXtensible Markup Language (XML) documents.

7. The method of claim 1, wherein the library is stored in persistent storage.

8. A system, comprising:
   persistent storage comprising a library;
   a node server coupled to the persistent storage and programmed to:
      obtain a detachable library, wherein the detachable library comprises a plurality of data files and each data file of the data files comprises a library scope identifier (ID), and wherein the library scope IDs are unique within the detachable library;
      reattach the detachable library to a database;
      assign a node scope ID to each data file of the data files in the detachable library, wherein the node scope IDs are unique within the database;
      create a mapping index using the node scope IDs and the library scope IDs, wherein the mapping index comprises a mapping index entry specifying a library scope ID for a data file in a parent library and a node scope ID;
      process a request from a client using the mapping index, wherein the request comprises a library scope ID.

9. The system of claim 8, further programmed to:
   prior to obtaining a detachable library:
      create a library;
      obtain the plurality of data files; and
      detach the library to obtain a detachable library.

10. The system of claim 8, wherein processing the request comprises:
    receiving the request for data from the client, wherein the request specifies a library scope pointer comprising the library scope ID;
    converting the library scope pointer to a node scope pointer using the mapping index, wherein the node scope pointer include a node scope ID corresponding the library scope ID;
    obtaining data from the detachable library using the node scope pointer; and
    providing the data to the client.

11. The system of claim 8, wherein at least one data file of the plurality of data files comprises data and a library scope pointer, wherein the library scope pointer comprises a library scope ID, a page ID, and a slot ID.

12. The system of claim 8, wherein the mapping index is stored in the node server, wherein the database is executing on the node server.

13. The system of claim 8, wherein the library comprises eXtensible Markup Language (XML) documents.

14. A non-transitory computer readable medium comprising computer readable program code, which when executed by a computer processor enables the computer processor to perform a method for servicing requests, the method comprising:
  obtaining a detachable library, wherein the detachable library comprises a plurality of data files and each data file of the data files comprises a library scope identifier (ID), and wherein the library scope IDs are unique within the detachable library;
  reattaching the detachable library to a database;
  assigning a node scope ID to each data file of the data files in the detachable library, wherein the node scope IDs are unique within the database;
  creating a mapping index using the node scope IDs and the library scope IDs, wherein the mapping index comprises a mapping index entry specifying a library scope ID for a data file in a parent library and a node scope ID;
  processing a request from a client using the mapping index, wherein the request comprises a library scope ID.

15. The non-transitory computer readable medium of claim 14, the method further comprising:
  prior to obtaining a detachable library:
    creating a library;
    obtaining the plurality of data files; and
    detaching the library to obtain a detachable library.

16. The non-transitory computer readable medium of claim 14, wherein processing the request comprises:
  receiving the request for data from the client, wherein the request specifies a library scope pointer comprising the library scope ID;
  converting the library scope pointer to a node scope pointer using the mapping index, wherein the node scope pointer include a node scope ID corresponding the library scope ID;
  obtaining data from the detachable library using the node scope pointer; and
  providing the data to the client.

17. The non-transitory computer readable medium of claim 14, wherein at least one data file of the plurality of data files comprises data and a library scope pointer, wherein the library scope pointer comprises a library scope ID, a page ID, and a slot ID.

18. The non-transitory computer readable medium of claim 14, wherein the mapping index is stored in a node server, wherein the database is executing on the node server.

19. The non-transitory computer readable medium of claim 14, wherein the library comprises eXtensible Markup Language (XML) documents.

20. The non-transitory computer readable medium of claim 14, wherein the library is stored in persistent storage.

* * * * *